(12) United States Patent
Khanka

(10) Patent No.: US 11,310,709 B2
(45) Date of Patent: Apr. 19, 2022

(54) SYSTEMS AND METHODS OF PREDICTIVE HANDOFF

(71) Applicant: T-Mobile USA, Inc., Bellevue, WA (US)

(72) Inventor: Bhagwan Singh Khanka, Bothell, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/588,445

(22) Filed: Sep. 30, 2019

(65) Prior Publication Data
US 2021/0099932 A1    Apr. 1, 2021

(51) Int. Cl.
| H04W 36/08 | (2009.01) |
| H04W 36/32 | (2009.01) |
| H04W 36/38 | (2009.01) |
| H04W 36/00 | (2009.01) |
| H04W 36/30 | (2009.01) |
| H04B 17/336 | (2015.01) |

(52) U.S. Cl.
CPC ....... *H04W 36/08* (2013.01); *H04W 36/0085* (2018.08); *H04W 36/30* (2013.01); *H04W 36/32* (2013.01); *H04W 36/38* (2013.01); *H04B 17/336* (2015.01)

(58) Field of Classification Search
None
See application file for complete search history.

(56) References Cited

U.S. PATENT DOCUMENTS

| 2006/0227744 A1* | 10/2006 | Metke | H04W 36/32 370/331 |
| 2006/0281461 A1* | 12/2006 | Kwun | H04W 28/18 455/436 |
| 2008/0233963 A1* | 9/2008 | Alanara | H04W 12/0602 455/438 |
| 2014/0057634 A1* | 2/2014 | Chang | H04W 36/00837 455/437 |
| 2015/0223117 A1* | 8/2015 | Jha | H04W 36/0016 455/436 |
| 2016/0135069 A1* | 5/2016 | Park | H04W 24/08 370/252 |
| 2019/0124578 A1* | 4/2019 | Nieh | H04W 36/32 |

* cited by examiner

*Primary Examiner* — Noel R Beharry
*Assistant Examiner* — Pamit Kaur
(74) *Attorney, Agent, or Firm* — Lane Powell PC

(57) ABSTRACT

Systems and methods of a predictive handoff that cause a handoff of user equipment from one network site to another network site. A network site connected to the user equipment monitors a quality of a signal between the network site and the user equipment and receives movement information from the user equipment. The network site selects a potential network site for the handoff of the user equipment based on the movement information and a potential signal quality between the user equipment and the potential network site. The network site coordinates the handoff and causes the selected potential network site to transmit a handoff instruction to the user equipment. The network site also instructs the user equipment to listen for the handoff instruction and the user equipment and potential network site can complete the handoff.

13 Claims, 5 Drawing Sheets

SYSTEMS AND METHODS OF PREDICTIVE HANDOFF

BACKGROUND

User equipment, such as mobile phones, other mobile devices and other cellular network-capable devices are constantly monitoring the quality of the signal between the user equipment and a network site. The user equipment is often mobile and can be in motion, whereas the network sites are often geographically fixed. Each of the network sites has a coverage area extending around it and as the user equipment moves through that coverage area, the signal quality between the user equipment and the network site can vary. For example, as the user equipment approaches the bounds of the coverage area, the signal quality can decrease. In another example, the user equipment can have an obstruction or environmental factor between the user equipment and the network site that causes the signal quality to decrease. A low quality signal can effect a user's use of the user equipment, such as dropping communications, slow communications and other user noticeable effects. Typically, when the signal quality decreases, the user equipment can start a potential handoff to another network site by searching for other network resources, such as one or more nearby network sites, to initiate a handoff or connect to for a better quality signal. If the signal quality continues to decrease, the user equipment can expand the search for other network resources. The ongoing searching by the user equipment for a better quality signal causes the user equipment to repeatedly exchange data with various network resources while searching. The searching by the user equipment does not end until the user equipment either finds another network resource to initiate a handoff to or the signal quality between the user equipment and the current network site increases to a sufficient quality level. Since a low quality signal can cause a poor user experience, many carriers and cellular networks attempt to have the user equipment connected to the best quality signal possible.

To allow this continuous communication between user equipment and various network sites to occur, most networks allocate a portion of the network bandwidth to ensure this searching process can occur. However, the total network bandwidth is a finite resource, so network bandwidth allocated for the process of performing a handoff cannot be used for other network functions or features regardless of its level of usage. That means any additional demands that are placed on the network, such as more users, devices or network usage, are constrained to the allowed bandwidth that is not reserved for the process of performing a handoff. As such, systems and methods of user equipment handoff that improve efficient and effective use of network bandwidth are needed in the art.

DETAILED DESCRIPTION

Figure 1:
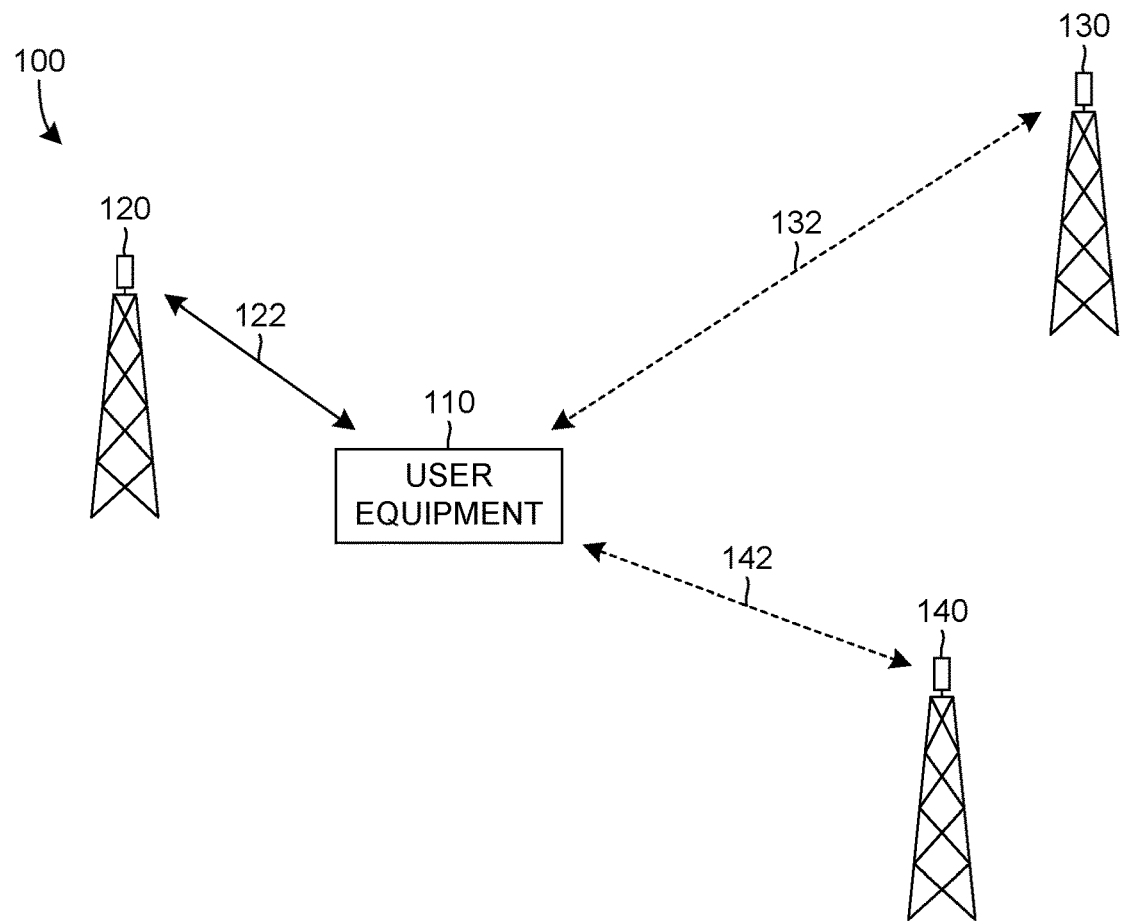
FIG. 1 is an example system of communication between user equipment and network sites.

The mobility of user equipment, such as cellular network devices, means that the user equipment needs to be transferred between various network resources, such as network sites, to maintain a connection with the network as the user equipment moves. The user equipment is connected or coupled to, such as by an electrical or electromagnetic coupling or connection, a network site to communicate with the network site and to access the network through the network site. As the user equipment moves, a handoff can be performed to transfer the user equipment to another network site. The process of performing a handoff requires a portion of a bandwidth of the network since the user equipment needs to communicate with one or more network sites to perform the handoff. The bandwidth of the network is a fixed resource and bandwidth allocated or reserved for performing handoffs, is bandwidth that is not usable for other purposes of the network, such as for user voice, text and data communications. By making the process of performing a handoff more efficient, the network bandwidth allocated for the process can be reduced, allowing more of the network bandwidth to be allocated for other uses of the network. The additional bandwidth available to other network features, such as user features, can provide a better user experience. To increase the efficiency of the process of performing a handoff, the amount of data communication performed by the user equipment with a network site can be reduced. The described systems and methods of predictive handoff reduce the amount of communication between user equipment and a network site and reduce the amount of bandwidth used to facilitate the handoff of user equipment between network sites. The predictive handoff systems and methods use the network site(s) to assist with facilitating the handoff of the user equipment, which reduces the network bandwidth usually required by user equipment facilitated handoffs. A network site connected to the user equipment, and optionally the user equipment itself, can monitor the quality of the signal between the network site and the user equipment. In an example, an indication of the quality of the signal between the network and the user equipment can be determined using one or more signal quality measurements or metrics. An example measurement can include the loudness or strength of the signal. The loudness of the signal is a ratio of the measured power of the signal to a base value, such as a milliwatt. The network site can measure the loudness of the signal by measuring the power of transmissions received from the user equipment and comparing the measured power to a base value. Similarly, the user equipment can measure the loudness of the signal by measuring the power of transmissions received from the network site and comparing the measured power to a base value, that can be the same or a different value the network site uses for determining the loudness of the signal. In an example, the user equipment can provide information regarding the quality of the signal to the network site. The quality of the signal refers to the comparison of the signal with respect to the ambient noise around. A typical quality measurement is SINR (Signal Interference over Noise Ratio). Additionally, or alternatively, other signal quality metrics or measurement can be used to assess the quality of the signal. The user equipment can provide signal quality measurements or metrics, such as loudness or SINR measurements, to the network site on a schedule, such as periodically, when queried by the network site, or automatically when the user equipment determines the signal quality is below a threshold. The user equipment can also provide movement information to the network site, such as a location of the user equipment, a speed of the user equipment, a direction of travel of the user equipment, or combinations thereof. The location of the user equipment can be a geographical location of the user equipment, such as determined by the user equipment using one or more sensors or systems. The speed of the user equipment can be a rate of movement of the user equipment, such as expressed in feet per second, miles per hour, or other rate of movement measurements. The direction of the user equipment can be a heading or bearing of the travel of the user equipment, such as determined by the user equipment using or more sensors or systems. The network site can evaluate the quality of the signal with the user equipment, the movement of the user equipment, or combination thereof to determine if the user equipment should be handed off to another network site.

The handoff is the disconnection or decoupling of the user equipment from one network site and the connection or coupling of the user equipment to another network site. This allows for uninterrupted access and use of the network by the user equipment. Since much user equipment is mobile, the handoff process can occur repeatedly as the user equipment moves out of range of one network resource and into the range of another.

In an example, the network site can monitor or determine one or more signal quality measurements or metrics, such as a loudness of the signal or the SINR, as an indicator of the quality of the signal. To perform the handoff, the network site can contact other potential network sites, such as surrounding or nearby network sites, to assess the potential signal quality of a potential signal between each of the potential network sites and the user equipment. The network site can use the movement information of the user equipment, such as the location or direction information, to select one or more other potential network sites to be contacted for this handoff analysis. The selected potential network sites can be contacted by the network site currently connected to the user equipment and each can provide an indication of the potential quality of the signal between the potential network site and the user equipment. The potential quality of the signal can includes a measure of the loudness or SINR of transmissions from the user equipment that are received or listened to by each of the potential network sites. Since the potential network sites are not directly coupled or connected to the user equipment, transmissions from the user equipment are not directed to the potential network sites. However, the potential network sites can still receive or "hear" the transmissions from the user equipment, such as by monitoring the frequency(s) or frequency band(s) the user equipment is transmitting over. The potential network sites can listen to or receive the user equipment transmissions in the uplink to determine a potential signal quality that can be provided to the connected network site.

The network site currently connected to the user equipment can evaluate the quality of its own signal with the user equipment in comparison to the potential signal qualities provided by the potential network sites. If the connected network site determines that one of the potential network sites can give the user equipment an improved signal quality in comparison to the quality the connected network site currently provides, the connected network site can communicate with the selected potential network site and the user equipment to coordinate a handoff. The connected network site can instruct the selected potential network site to transmit or output a message instructing the user equipment to initiate a handoff to the selected potential network site. The selected potential network site can transmit the handoff instruction over a common channel to which the user equipment has been instructed to listen to by the connected network site. The user equipment and the selected potential network site can then complete the handoff of the user equipment.

In the predictive handoff systems and methods, the network is tracking the user equipment based on its communication with it and regular communication of its location, allowing the network site to anticipate or predict potential user equipment handoffs and to select a suitable network site for the user equipment to initiate a handoff. In other signaling systems and methods, the user equipment can be repeatedly contacting and exchanging data with multiple network sites to evaluate potential handoffs. The network will monitor the signal strength, such as loudness, and the quality of the signal with the user equipment and decide the time to ask the user equipment of the details. In addition, the user equipment can periodically send information to the network based on one or more conditions. As such, the periodicity will not be constant but rather based on certain user equipment conditions. The user equipment can be provided signal quality thresholds and can implement various processes, such as searching for potential handoffs, when the signal quality decreases below one or more of the quality thresholds. The periodic communication of the predictive handoff systems and methods use less bandwidth than the other signaling systems and methods. The reduced bandwidth usage of the predictive handoff systems and methods can allow more of the overall network bandwidth to be provided to other functions or features of the network, such as user voice, text and data communications. The increased bandwidth now available to other functions or features of the network can result in a better experience for users of the network.

Additionally, the predictive handoff systems and methods can use the movement and other data of the user equipment to further reduce the bandwidth the user equipment uses for a handoff. In an example, the rate or frequency at which the user equipment provides movement information to a network site can be variable, such as dependent on the movement of the user equipment. By varying the frequency the movement information is provided, the amount of bandwidth used by the user equipment to provide the movement information to the network site can be varied. For stationary or slow moving user equipment, the frequency at which the movement information is provided to the network site can be less than the frequency for user equipment moving at a high rate of speed. The user equipment can include programming or can receive instructions, such as from a network site, that varies the movement information transmissions to a network site based on the movement of the user equipment. Additionally, geofencing can be used to vary the frequency of movement information provided by the user equipment to a network site. Geofencing can define a geographical area that can be interpretable by the user equipment. The user equipment can compare its location with a geofenced area to determine whether the user equipment is within or is outside of the geofenced area. Depending on the user equipment's location relative to the geofenced area, the user equipment can perform various operations. In an example, geographical location at which the user equipment may be stationary or located at for extended periods of time can be learned or set, such as by a geofence that is determined by the user equipment or the network, and the frequency of movement information provided by the user equipment can be reduced when the user equipment is located in a geofenced area.

By reducing the network bandwidth that is used or allocated for use by user equipment and network sites for user equipment handoffs, the network bandwidth used for other purposes can be increased. This can allow more network bandwidth to be allocated for use by users of the network, such as for voice, text and data communications.

FIG. 1 illustrates an example system 100 that includes a user equipment 110, such as a mobile phone or mobile device, and multiple network sites 120, 130, 140, such as cell towers. The user equipment 110 can connect and communicate with one of the cell towers, such as 120 by connection 122, to access various network functions and features, such as for voice, text or data transmissions. Each of the network sites 120, 130, 140 has a coverage area that extends from the network site. The extent of the coverage area and the quality of signal across the coverage area of a network site can be affected by various factors, such as environmental factors, equipment factors, geographical and other factors. As the user equipment 110 moves through the area covered by the network sites 120, 130, 140, the user equipment 110 can experience a lessening in the current connection or signal 122 quality. The reduction in signal 122 quality can cause the user equipment 110 to search for another network site, such as 130 or 140, that may have a better quality of signal with the user equipment 110. The monitoring of the signal quality is performed by the user equipment 110 and can cause the user equipment 110 to contact the various network sites 120, 130, 140 to search for better quality connections or signals.

In the example, the user equipment 110 is connected or coupled to a connected network site 120, such as by an electrical, radio or an electromagnetic connection or coupling. The user equipment 110 can communicate with and through the connected network site 120 to access the network and various functions or features thereof. The network or the connected network site 120 can provide the user equipment 110 various network quality parameters, or thresholds, that the user equipment 110 uses to evaluate the quality of its current signal and to cause the user equipment 110 to communicate with other, alternative network sites for potential connection. The user equipment 110 can use the provided parameters to monitor the current signal 122 to decide if a handoff to another network site, such as 130 or 140, is needed.

While connected to the network site 120 by the signal 122, the user equipment 110 can exchange data with the network site 120 as part of the user equipment's signaling. The signaling of the user equipment 110 can include data exchange or communication with the currently connected network site 120 and other network sites 130, 140 to which the user equipment 110 may handoff and with which the user equipment establishes a connection. As distance between the user equipment 110 and the connected network site 120 grows, such as the user equipment 110 approaching the boundary of the coverage area of the connected network site 120, or as there are additional obstacles between the user equipment 110 and the connected network site 120, the quality of the signal 122 tends to degrade. Rather than letting the signal 122 degrade to an unusable or an otherwise reduced quality, the user equipment 110 can initiate a handoff or transfer its connection to another network site that has a greater signal quality, such as a closer network site or a network site to which the user equipment 110 is moving toward.

The user equipment 110 can signal with other potential network sites based on the signal quality parameters provided by the network or connected network site 120, for example. The signaling with the alternative network sites 130, 140 can occur using signals 132, 142, over which the user equipment 110 can exchange data or communications with the other network sites 130, 140 to evaluate the potential signal quality of a potential signal between the user equipment 110 and the other network sites 130, 140. This signaling between the user equipment 110 and the connected network site 120 and the alternative network sites 130, 140, requires a portion of the bandwidth of the network signal spectrum. The network bandwidth needed for signaling can be specifically set aside for that purpose to allow the user equipment 110 of the network to be able to initiate a handoff to another network site to assist with maximizing the quality of the network signal to the user equipment. However, since this bandwidth is dedicated to signaling between the network and the user equipment, it cannot be used for one or more other network functions or features, such as the bandwidth provided to users of the network for various services, such as voice, text and data communications.

Figure 2:
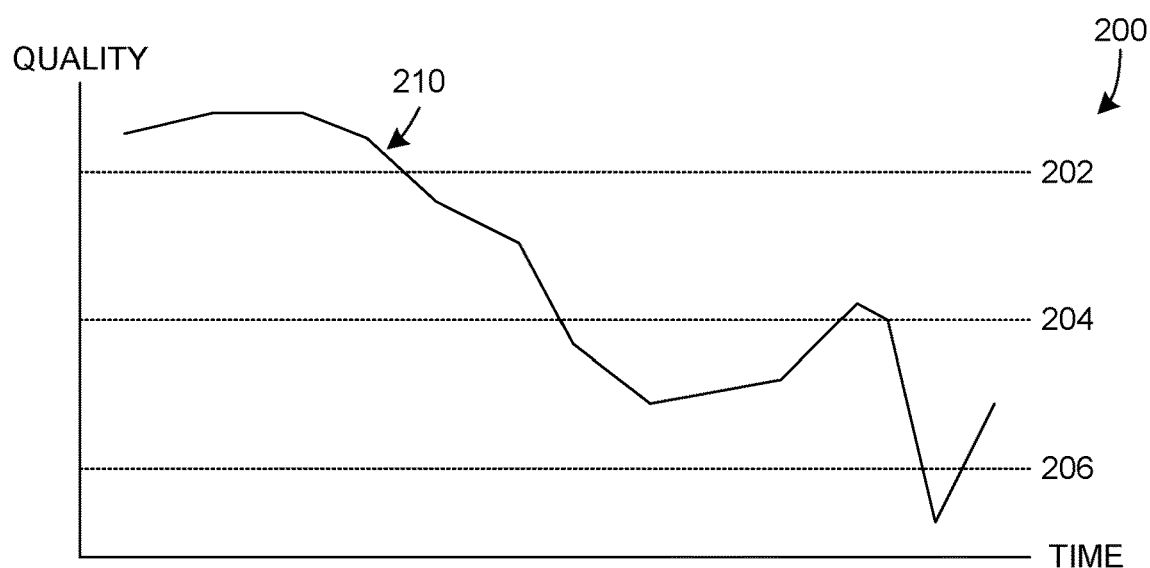
FIG. 2 is a diagram of network signal quality and thresholds for a user equipment.

FIG. 2 is an example diagram 200 of the various signal quality thresholds for a handoff that can be provided to user equipment, such as 110 of FIG. 1, by the network. The signal quality thresholds can be provided by a network site, such as 120 of FIG. 1, to be used by the user equipment when assessing its current signal quality and when a handoff to another network resource may be required. In the diagram 200, the quality of the signal 210 between the user equipment and the network is shown with respect to time. The diagram 200 includes various parameters or quality thresholds 202, 204, 206 that can cause the user equipment to initiate various signaling processes to evaluate a potential handoff to another network site or resource. The user equipment can monitor the quality of the signal, and as the quality of the signal 210 falls below one of the thresholds 202, 204, 206, the user equipment can initiate various signaling processes in an attempt to find a higher quality signal for a handoff. As the signal quality degrades or decreases below each of the threshold 202, 204, 206 the various signal processes available to the user equipment can expand. These parameters and the various processes associated with each are provided to the user equipment by the network and can be updated or revised by the network as needed.

In the example shown, the first threshold 202 can cause the user equipment to perform a search for another signal, such as from another network site, within the same frequency or frequency band in which the user equipment is currently operating. The user equipment can scan for other network resources, such as network sites, operating in the same frequency or frequency band in which the user equipment is operating. If the signal quality continues to degrade and another suitable signal is not found, the quality of the signal 210 can fall below the second threshold 204. When the signal quality falls below the second threshold 204, the user equipment expands its search for a potential handoff. In this example, when the quality of the signal 210 falls below the second threshold 204, the user equipment can expand the search for a higher quality signal to include signals in other frequencies or frequency bands. During this signaling process, the user equipment can continue to search for alternative signals in the same frequency or frequency band as the user equipment and search for signals outside of the same frequency or frequency band as the user equipment. That is, the user equipment can continue to scan for a signal in the same operating frequency or frequency band as the user equipment and also scan frequencies or frequency bands outside of the operating frequency or frequency band of the user equipment. This expanded searching increases the likelihood that the user equipment will find a higher quality signal and the user equipment can initiate a handoff to operate using the higher quality signal.

If the signal quality continues to degrade without the user equipment performing a handoff to another network site, the quality of the signal 210 can fall below the third threshold 206. The threshold 206 can cause the user equipment to begin further signaling procedures or processes, such as to expand the user equipment searching for higher quality signals using other, alternative communication technologies, such as a signal using Universal Mobile Telecommunications System (UMTS) or Global System for Mobile Communications (GSM) instead of Long Term Evolution (LTE) technology. Now the user equipment is not only searching for other potential network sites of the same and other frequencies of the current signal, but also signals of other, alternative technologies. All the while, as the search for a higher quality signal is ongoing, the user equipment is signaling with various network sites to evaluate potential signal quality. Even if a new network site connection is found, additional signaling can be required to authenticate the user equipment to the new network site and establish a connection between the user equipment and the new network site. Again, this signaling uses a portion of the network bandwidth that is usually dedicated to such signaling, which can reduce the network bandwidth allocated or allocable to other network functions or features, such as user communications and data usage.

Figure 3:
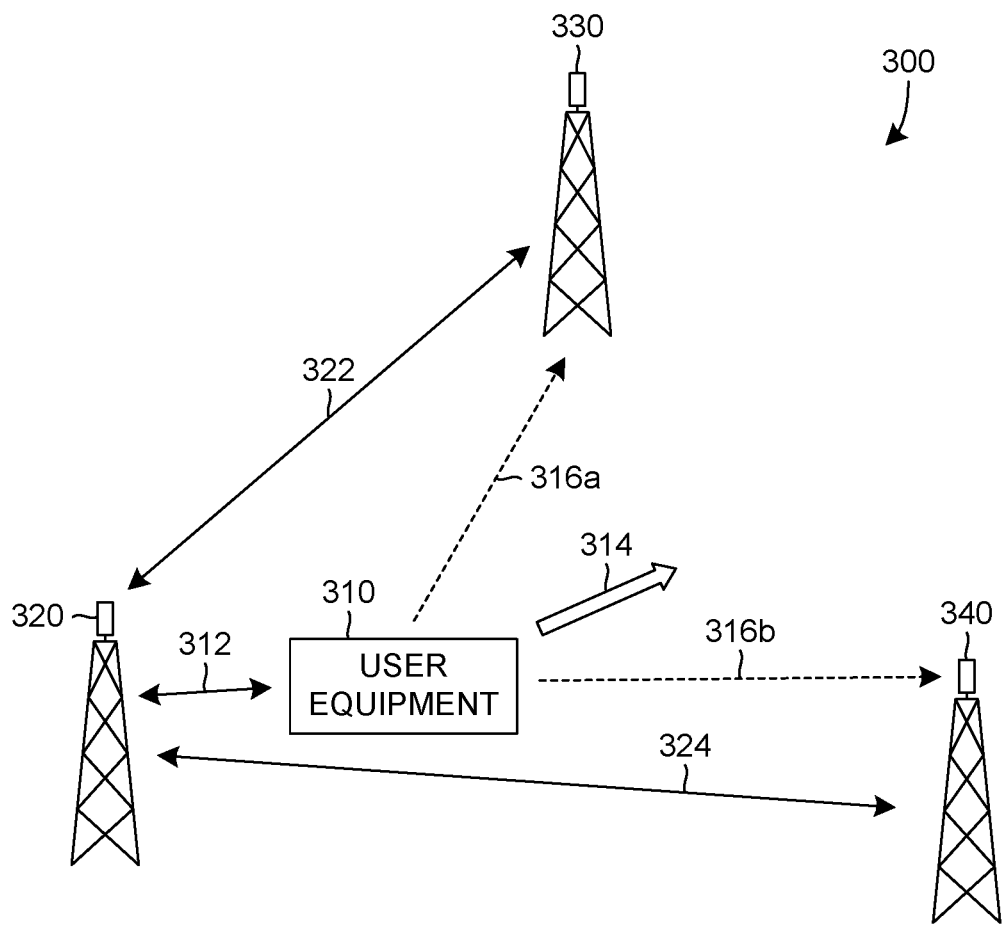
FIG. 3 is an example handoff system.

FIG. 3 illustrates an example handoff system 300 that can predict or anticipate the handoff of user equipment, such as 310, to another network site, which reduces the need for the user equipment 310 to communicate with alternative network sites for the potential handoff. In the example system 300, the user equipment 310 is connected 312 to a first or current network site 320, through which the user equipment 310 can access various functions or features of the network. The user equipment 310 can be moving 314 through the area and away from the current network site 320 towards other, alternate network sites 330 and 340. As the user equipment 310 moves 314 away from the current network site 320, a quality of the connection or signal 312 may degrade and the user equipment 310 may need to initiate a handoff to one of the alternate network sites 330, 340.

In the handoff system 300, rather than rely on the user equipment 310 to perform all the signaling for finding and initiating a handoff to a potential network site, such as 330 or 340, the system 300 can predict or anticipate the handoff by selecting a suitable potential network site and instructing the user equipment 310 to initiate the handoff to the selected potential network site. The network site 320 to which the user equipment 310 is currently connected can monitor the quality of the signal 312 between the connected network site 320 and the user equipment 310. In an example, the connected network site 320 can monitor the loudness of the signal 312 to assess the quality of the signal. A louder signal has a higher quality than a quieter signal. Alternatively, or additionally, the connected network site 320 can monitor the SINR of the signal 312 to assess the quality of the signal 312. The higher quality signal has more communication efficiency than a lower quality one, such as being able to transmit more data, transmit data faster, increased fidelity, reduced data loss, and other increased or better signal characteristics over a lower quality signal. Additionally, or alternatively, the user equipment 310 can provide indications or information regarding the quality of the signal 312 to the connected network site 320. The connected network site 320 can monitor the quality of the signal 312 and can include various thresholds or parameters that can be used to determine if a handoff of the user equipment 310 to another network site is needed.

The user equipment 310 provides information regarding movement 314 of the user equipment 310 to the connected network site 320. Example information provided by the user equipment 310 can include positional information of the user equipment 310, speed information regarding the movement 314 of the user equipment 310, directional information of the movement of the user equipment 310, other information regarding the movement 314 of the user equipment 310, or combinations thereof. The connected network site 320 or the system 300 can use the movement information of the user equipment 310 to predict or anticipate where the user equipment 310 will be located in the future so that the connected network site 320 or the system 300 can identify potential network sites to which the user equipment 310 can initiate a handoff.

In the example shown in FIG. 3, the general direction of movement 314 of the user equipment 310 is toward the potential network sites 330 and 340. The connected network site 320 can receive the movement information of the user equipment 310 to identify the potential network sites that might be suitable for the handoff of the user equipment 310. To identify the potential network sites 330, 420, the connected network site 320 can include or can have access to a network map or information that identifies surrounding or nearby network sites and their geographical location. Alternatively, or additionally, the connected network site 320 can communicate with potential network sites 330, 340 to receive their individual geographical locations, which can also be stored for future use. The connected network site 320 or the system 300 can compare the location and directionality of movement 314 of the user equipment 310 to the locations of the nearby network sites to identify the potential network sites, 330, 340, for the handoff.

To provide the movement information to the connected network site 320, the user equipment 310 can use the connection or signal 312. The transmission of movement information by the user equipment 310 to the connected network site 320 uses some portion of the network bandwidth. However, the communication between the user equipment 310 and the connected network site 320 is not occurring in a continuous or ongoing manner, unlike the examples of FIGS. 1 and 2, in which the user equipment is repeatedly signaling with various network sites for a potential handoff. The user equipment 310 can provide periodic or repeated updates of its movement information to the current network site 320, but this data transmission requires a reduced amount of network bandwidth in comparison to the signaling shown in FIGS. 1 and 2.

After identifying potential network sites 330, 340 to which the user equipment 310 can complete a handoff, the connected network site 320 can communicate with those network sites 330, 340 using communication pathways 322, 324, that are not part of the network bandwidth used for communication with and by the user equipment 310. In an example, the communication pathways 322, 324 can be hardline or physical communication links between the connected network site 320 and the potential network sites 330, 340. In another example, the communication pathways 322, 324 can be wireless communication pathways that are in a spectrum or bandwidth that are unusable or inaccessible by user equipment of the network.

The connected network site 320 can communicate with the potential network sites 330, 340 to determine which network site 330, 340 is best for the handoff of the user equipment 310. To do so, the connected network site 320 can instruct the potential network sites 330, 340 to listen for the user equipment and respond to the connected network site 320 with an indication of a potential signal quality, such as an SINR, loudness or strength, between the user equipment 310 and the potential network sites 330 and 340. The potential signal quality is the quality of a potential signal between the user equipment 310 and a potential network site, such as 330, 340. The potential network sites 330 and 340 can listen for transmissions 316a, 316b by the user equipment 310 and can determine a potential signal quality, such as by measuring or determining an SINR, loudness, or other signal quality metric or measurement of the transmission from the user equipment 310. The transmissions 316a and 316b by the user equipment 310 are not directed to either of the potential network sites 330, 340. Rather, the transmissions 316a, 316b are communications in the uplink to the network site 320 that can also be detected or picked up by the potential network sites 330, 340. The potential signal quality information can be provided by the potential network sites 330, 340 to the currently connected network site 310. In this example, the connected network site 320 evaluates the potential signal quality information received from the potential network sites 330, 340 and the quality of the signal 312 between the connected network site 320 and the user equipment 310. If the quality of the signal 312 is still the best or is of sufficient quality as compared to the potential network sites 330, 340, then the connected network site 320 can maintain the signal 312 with the user equipment 310 and not facilitate a handoff of the user equipment 310 at that time. If the potential signal quality with one of the potential network sites 330, 340 is greater than the quality of the signal 312, the connected network site 320 can begin a process to initiate a handoff the user equipment 310 to the potential network site with the greater potential signal quality.

After a potential network site, such as potential network site 340, is selected for the handoff by the connected network site 320, the connected network site 320 instructs both the potential network site 340 and the user equipment 310 to prepare for the handoff. The connected network site 320 instructs the potential network site 340 to transmit a handoff instruction or message to the user equipment 310 via a common channel. The connected network site 320 also instructs the user equipment 310 to listen to the common channel for the handoff message from the potential network site 340. The user equipment 310, after it has received the handoff message from the potential network site 340, initiates the handoff to the potential network site 340. The predictive process of initiating a handoff the user equipment can continue, with the newly connected network site 340 receiving movement information from the user equipment 310 and coordinating the handoff of the user equipment 310 to another network site, as needed.

Figure 4:
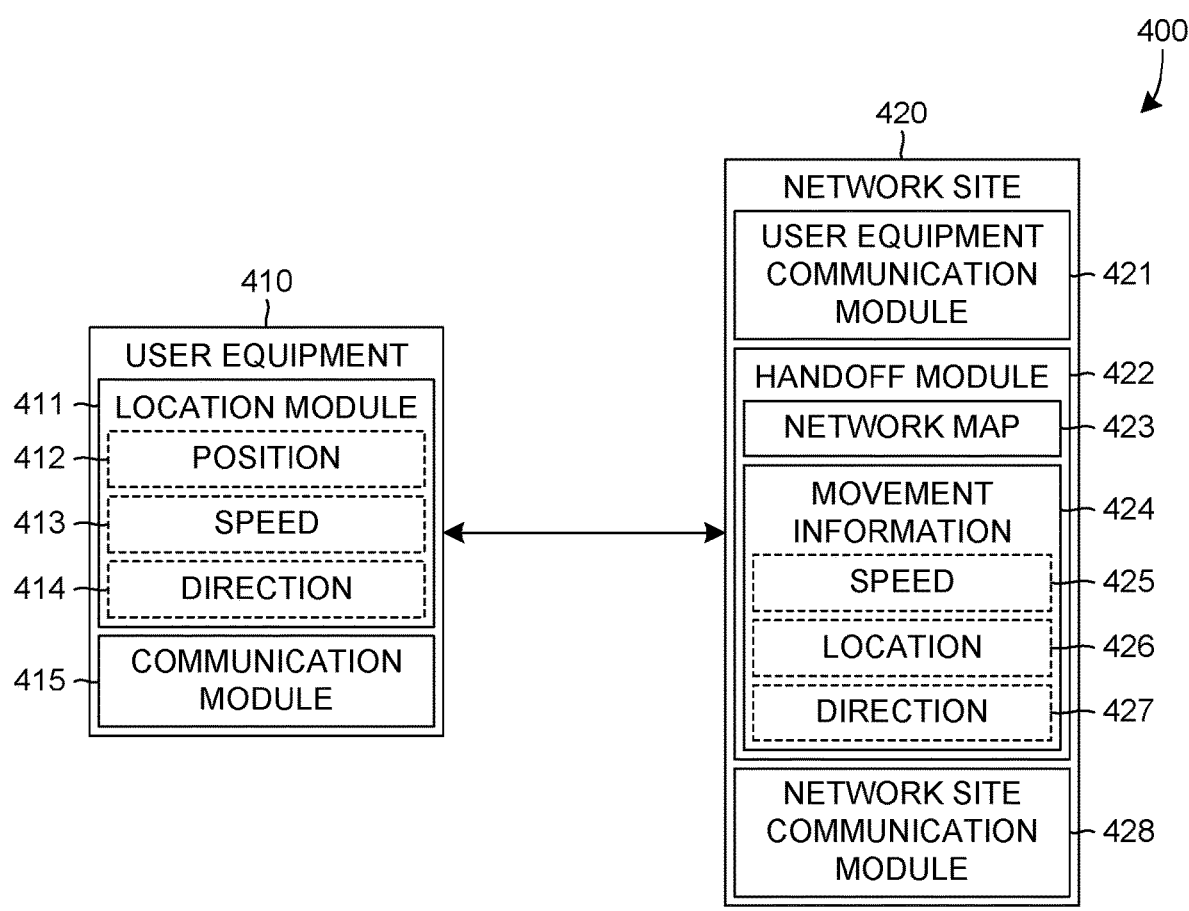
FIG. 4 is a block diagram of an example handoff system.

FIG. 4 is a block diagram of an example predictive handoff system 400 that includes user equipment 410 and a network site 420. The user equipment 410 is connected to the network site 420 to access various functions and features of the network, such as for voice communications, text communication, data communications, or combinations thereof. The user equipment 410 can move relative to the network site 420, such as a cell tower, which has a physical location that is not substantially changing. The network site 420 has a coverage area that is a geographical area about the network site 420 over which signals can be exchanged or a connection maintained between the network site 420 and the user equipment 410. As the user equipment 410 moves about the coverage area of the network site 420, the quality of the connection or signal between the network site 420 and the user equipment 410 can vary. At various locations, the quality of the signal can decrease below one or more thresholds or parameters and the user equipment 410 may need to switch to another network site 420 to have a stronger or higher quality signal for communication between the user equipment 410 and the network.

As shown in FIGS. 1 and 2, the user equipment 410 can perform various signaling operations to monitor the quality of its signal to the network and can perform various searches for alternative connections to the network based on the quality of its current connection or signal. In the system 400, the network site 420 can assist with or perform at least a portion of the process of initiating a handoff, which reduces the network bandwidth used by the user equipment 410 in comparison to the signaling processes shown in FIGS. 1 and 2.

The user equipment 410 can include a location module 411 for determining location or movement information regarding the user equipment 410 and a communication module 415 for communicating with the network site 420 and that can also be used to access one or more functions or features of the network. The user equipment 410 can establish a connection with the network site 420, through which the user equipment 410 accesses the network and various resources associated therewith. As part of the predictive handoff system 400, the user equipment 410 can provide information regarding movement of the user equipment 410 to the network site 420 to allow the network site 420 to evaluate and select other potential network sites that the user equipment 410 can initiate a handoff to, to maintain a connection to the network. The handoff can be based on the current quality of the signal between the user equipment 410 and the network site 420, the potential signal quality between the user equipment 410 and another network site, or a combination of the two.

The location module 411 can provide various information regarding movement or lack thereof, of the user equipment 410. The location module 411 includes various sensors, systems or combinations thereof that can be used to monitor various aspects of the movement of the user equipment 410. Example aspects of the user equipment 410 can include a geographical position or location 412 of the user equipment 410, a speed 413 of the movement of the user equipment 410, a direction 414 of the movement of the user equipment 410, or a combination thereof. To determine information regarding movement of the user equipment 410, the location module can include or use information from an accelerometer, a compass, a satellite positioning system, such as the Global Positioning System (GPS), other sensors or systems of the user equipment 410, or a combination thereof.

The information regarding the movement of the user equipment 410 is provided to the network site 420 to allow the network site 420 to determine potential other network sites to which the user equipment 410 can initiate a handoff. The movement information can be provided on request, on a periodic schedule, or on another temporally-based manner or schedule, and the timing of the provided movement information can be revised or changed, such as by the user equipment 410 or the network site 420. In an example, if the user equipment 410 is moving at a high rate of speed, the user equipment 410 can provide the movement information to the network site 420 at a first rate or schedule that is based on the movement of the user equipment 410. In the example, the user equipment 410 can provide the movement information frequently to the network site 420 because the high rate of speed can mean the user equipment 410 may soon move out of the coverage area of the network site 420 or that the quality of the signal between the network site 420 and user equipment 410 may change rapidly due to the movement of the user equipment 410.

In another example, the user equipment 410 can be moving at a slower rate of speed or may be stationary. In this example, the user equipment 410 can provide movement information to the network site 420 at a second rate that is less frequent than the first rate since the user equipment 410 will likely take longer to move out of the coverage area of the network site 420 or since the quality of the signal between the network site 420 and the user equipment 410 is not likely to rapidly change due to movement of the user equipment 410. Again, the schedule or rate of providing movement information of the user equipment 410 to the network site 420 can be changed or modified as needed and by one or both of the user equipment 410 and the network site 420.

The communication module 415 can include various elements and systems to allow the user equipment 410 to communicate with the network site 420 and the various resources of the network. In an example, the communication module 415 can include a transceiver, an antenna and other elements or systems to support communications from and to the user equipment 410. The communication module 415 can provide the network site 420 to user equipment 410 movement information determined or collected by the location module 411. Additionally, the communication module 415 can receive messages and instructions from the network site 420 and other network sites to initiate a handoff to another network site.

The network site 420 includes a user equipment communication module 421 for communicating with the user equipment 410, a handoff module 422 for determining if and when to initiate a handoff of the user equipment 410 to another network site, and a network site communication module 428 to communicate with other network sites. The network site 420 can receive movement information from the user equipment 410 and can use that information to select potential network sites for a handoff of the user equipment 410. From the potential network sites, the network site 420 can select one potential network site with which to initiate a handoff of the user equipment 410 and can coordinate the handoff between the user equipment 410 and the selected network site to which the user equipment 410 will handoff. The communication between the network site 420 and the potential and selected network sites can be by the network site communication module 428. The network site communication module 428 uses wired connection(s), wireless connection(s), or a combination thereof to communicate with the other network sites. The connection used for communication between the network sites is inaccessible to and unusable by the user equipment 410.

The user equipment communication module 421 can communicate with the user equipment 410 to exchange various information, such as receiving movement information from the user equipment 410 and providing handoff instructions to the user equipment 410. Additionally, the user equipment communication module 421 can monitor the quality of the signal between the user equipment 410 and the network site 420, such as an SINR or loudness of the signal. Additionally, or alternatively, the user equipment 410 can monitor the quality of the signal and can provide information regarding the signal quality to the network site 420. The network site 420 can use the quality signal as a consideration for determining whether to initiate a handoff the user equipment 410 to another network site.

The handoff module 422 can include a network map 423 and movement information 424 that can be used to determine whether the user equipment 410 should be handed off to another network site and which of the other network sites is best for the handoff for the user equipment 410. The handoff module 422 provides the predictive aspect of the handoff system 400 by evaluating the movement of the user equipment 410 and other potential network sites to which the user equipment 410 can be handed off, rather than the user equipment 410 itself searching for alternative network sites, such as shown in FIGS. 1 and 2.

The network map 423 can include location information of other network sites around the network site 420. Using the network map 423, the handoff module 422 can evaluate a position of the user equipment 410 relative to other potential network sites to which the user equipment 410 could connect or with which the user equipment 410 could initiate a handoff. The network map 423 can be stored and accessed locally by the handoff module 422 or can be accessible to the handoff module 422 via the network or another communication interface. In an example, the network map 423 can also include other information regarding the environment about network site 420, such as obstructions, roads and transportation infrastructure and information regarding the coverage area and signal quality of other network sites. The handoff module 422 can evaluate the information of the network map 423 when selecting one or more potential other network sites for the user equipment 410 to evaluate for a handoff.

The handoff module 422 can process the movement information 424 received from the user equipment 410, such as a speed 425, location 426, a direction 427 of the user equipment 410, or a combination thereof. The handoff module 422 can process or evaluate the movement information 424 to predict or anticipate a future location of the user equipment 410. Using this predicted future location of the user equipment 410, the handoff module 422 can select one or more other potential network sites for the user equipment 410 to evaluate for a handoff. Additionally, the handoff module 422 can use the movement information 424 to determine a frequency, rate or schedule by which the user equipment 410 is to provide movement information 424 to the network site 410. For example, if the handoff module 422 determines the user equipment 410 is not moving very fast (e.g., is above a threshold speed or velocity) or is stationary, the user equipment communication module 421 can instruct the user equipment 410 to provide movement information 424 less frequently than if the user equipment 410 was moving quickly. In another example, if the user equipment 410 is determined to be approaching an extent of the coverage area of the network site 420, such as by location information 426 of the user equipment 410 or a signal quality, the user equipment communication module 421 can instruct the user equipment 410 to more frequently provide location information 426 as a handoff of the user equipment 410 may be more imminent.

By tracking the movement of, and the quality of the signal with, the user equipment 410, the network site 420 can determine whether to initiate a handoff the user equipment 410 to another network site that may better service the user equipment 410, such as by providing a higher quality signal or connection with the user equipment 410. Additionally, the network site 420 can select potential other network sites for the user equipment 410 to connect to by predicting or evaluating network sites that are most likely to have a coverage area that spans the likely travel or movement of the user equipment 410. The predictive handoff system 400 reduces the signaling required between the user equipment 410 and one or more network sites for a handoff by having the currently connected network site 420 designate another network site for the handoff. The reduced signaling requires less bandwidth allocation for the signaling between the user equipment 410 and network sites, which can allow the saved bandwidth to be allocated to other network functions or features, such as providing additional bandwidth to users of the user equipment 410.

Additionally, the system 400 can be adaptable or configured to learn to assist with further reducing the signaling between the user equipment 410 and network sites, such as 420. In an example, the user equipment 410 can display a routine, such as residing in a particular location for extended periods of time. The user equipment 410, the network, or both, can learn and store this information and when the user equipment 410 is located at the particular location, the user equipment 410 can, or can be instructed by the network to, reduce the amount of or cease signaling between the user equipment 410 and a network site 420 since it can be assumed that the user equipment 410 will remain located at the particular location for an extended period of time and will be unlikely to require being handed off to another network site. While the user equipment 410 is at the particular location, environmental factors can impact the quality of the signal between the user equipment 410 and the connected network site, such as 420. However, the system 400 can assume that such effects may be temporary. Since the effects on the quality of the signal are temporary, the system can have the user equipment 410 remain connected to the network site 420, even when the signal quality decreases. To prevent the system 400 from seeking another network site for the user equipment 410, the system 400 can alter a threshold quality level, such as setting the threshold to a lower level of signal quality that triggers the system, or network site 420, to begin finding an alternative network site for the user equipment 410. Additionally, or alternatively, the user equipment 410 can be provided instructions to stop providing, or not to provide, movement information 424 when the user equipment 410 determines it is relatively stationary and can include instructions to cause the user equipment 410 to begin or resume providing movement information 424 when the user equipment 410 determines it is in motion, such as based on a motion sensor of the user equipment 410 or by crossing a geofenced boundary.

In another example, communication of movement information 424 by the user equipment 410 can include geofenced boundaries. In the example, locations at which the user equipment 410 is stationary for extended periods of time, such as at a home and work location, can be geofenced so that the user equipment 410 can recognize or determine when the user equipment 410 is located at such a location. When the user equipment 410 determines it is within a geofenced area, it can cease or reduce the rate of providing movement information 424 to a network site, such as 420. Alternatively, or additionally, the user equipment 410 can include a setting or receive an instruction that causes the user equipment 410 to cease or reduce providing movement information 424 when the user equipment 410 determines it is stationary beyond a time threshold.

In a further example, the network map 423 can include all or a portion of the roads in the area about the network site 420. The handoff module 422 can determine if the user equipment 410 is traveling by car based on the movement information 424 and can determine the road along which the user equipment 410 is traveling. The network site 420 can narrow the potential other network sites for the user equipment 410 based on the network sites that have a coverage area that includes the road or route the user equipment 410 is moving along.

By varying or adapting the rate or frequency that the movement information is provided by the user equipment 410 to the network site 420, the amount of bandwidth needed for signaling between the user equipment 410 and the network site 420 can be further reduced. The reduction in network bandwidth allocated for signaling purposes can allow for more network bandwidth to be allocated to other network uses or resources, such as network bandwidth available to users for voice, text and data communications.

Figure 5:
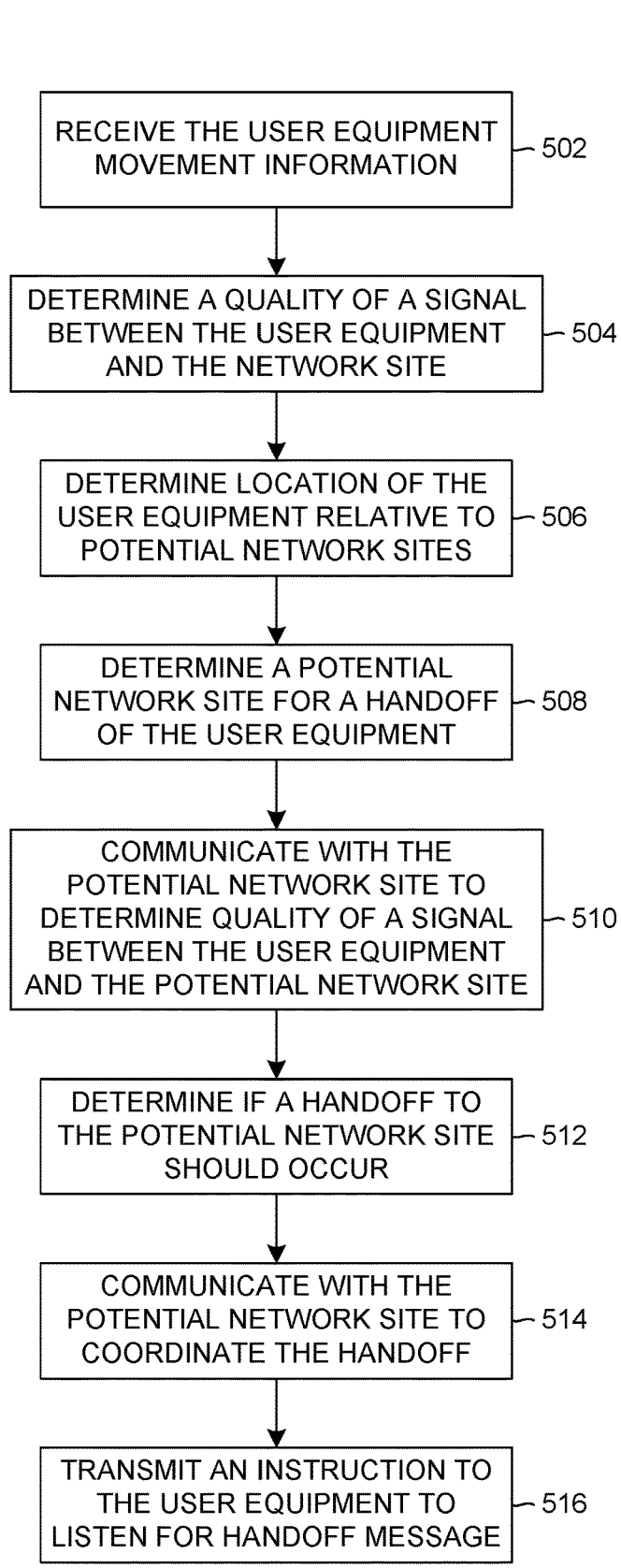
FIG. 5 is an example method of instructing user equipment to perform a handoff.

FIG. 5 is an example method 500 of a network site instructing a handoff to user equipment. At 502, movement information of the user equipment, such as the user equipment location, speed, direction or other movement information of the user equipment is received by a connected network site that the user equipment is currently connected to. In an example, the user equipment can be connected to the connected network site to access a network, such as a cellular network. The movement information can be provided by the user equipment according to a rate, frequency, or schedule that can be varied by the user equipment or the connected network site. At 504, the quality of the signal between the connected network site and the user equipment can be determined. In an example, the SINR, loudness, or both, of the signal can be an indicator of the quality of the signal between the user equipment and the connected network site. At 506, the location of the user equipment relative to potential network sites, such as other cell towers, can be determined. The relative location of the user equipment and the potential network sites can be evaluated to determine at least one potential site for handoff at 508.

At 510, the connected network site can communicate with the potential network site(s) to determine the quality of the signal between the user equipment and the potential network site(s). Each of the potential network sites can be contacted by the connected network site and provided information regarding the user equipment, such as the resources the user equipment is currently using. In response, the potential network site(s) can provide the connected network site an indication of the potential signal quality of a potential signal between the user equipment and the potential network site(s). The potential network site(s) can listen for the user equipment, such as for transmissions by the user equipment, and can provide to the connected network site an indication of the potential signal quality, such as an SINR, loudness, or both, of the user equipment transmissions received by the potential network sites. At 512, the signal quality information received from the potential network site(s) is evaluated to determine if a handoff of the user equipment to the potential network site should occur. The connected network site can compare the quality of signal with the user equipment to the signal quality information provided by the potential network site(s) to determine if the user equipment should initiate a handoff. This process can be repeated to verify or assist with determining a potential network site to which the user equipment can initiate a handoff. For example, the signal quality information received from the potential network site(s) can include multiple signal qualities gathered over a period. When evaluating multiple potential network sites, the connected network site can assess the signal quality of each of the potential network sites to identify or determine the most suitable potential network site for the handoff.

At 514, the network site communicates with the potential network site to coordinate or facilitate the handoff. The connected network site can cause the potential network site to output a message that instructs the user equipment to initiate a handoff from the connected network site to the potential network site. The message from the potential network site can be transmitted over a common channel. To complete the handoff, at 516, the connected network site can transmit an instruction to the user equipment to coordinate the handoff. The instruction can instruct the user equipment listen to the common channel for a message from the potential network site. The user equipment then moves to the resource indicated by the potential network site in the message that the user equipment received over the common channel to complete the handoff.

Figure 6:
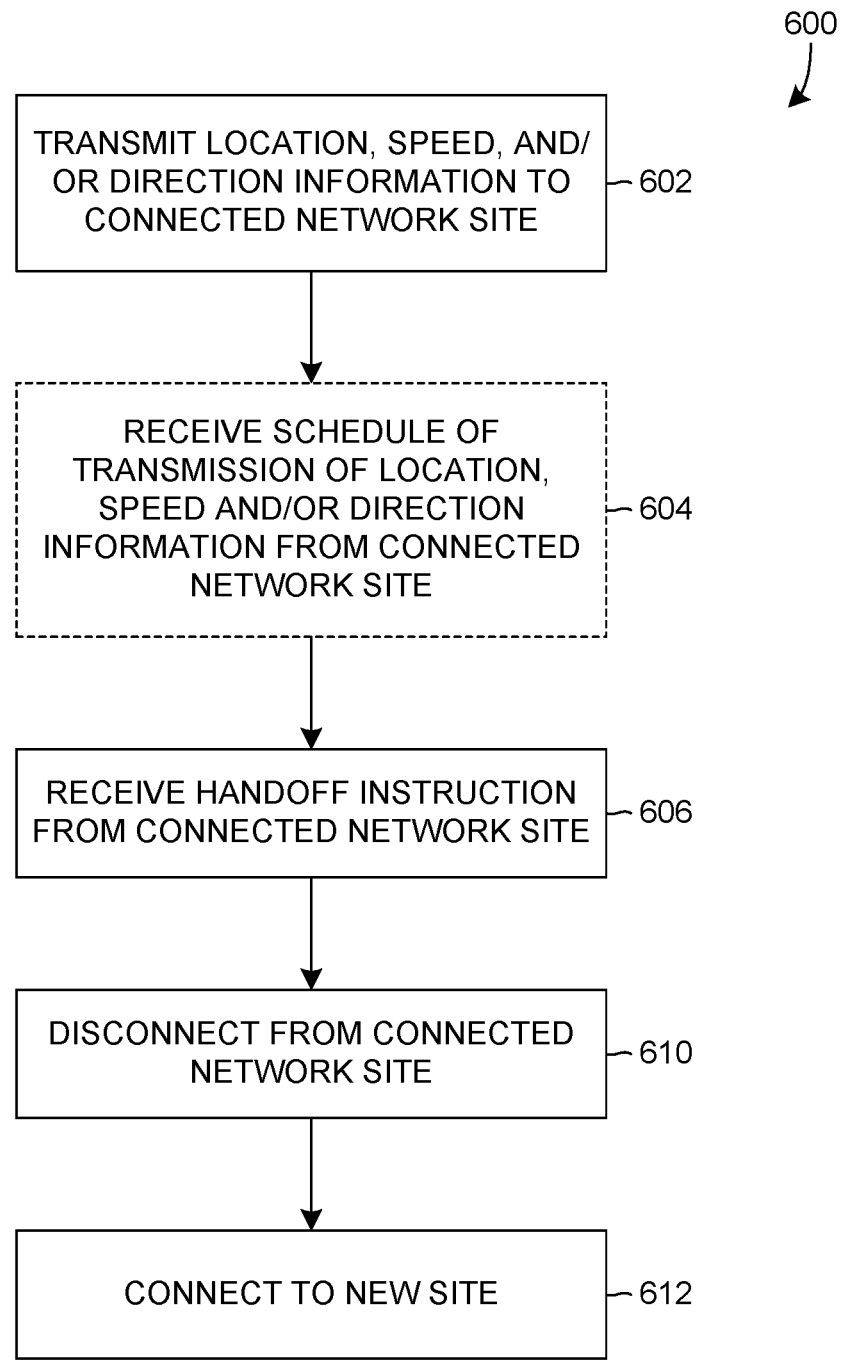
FIG. 6 is an example method of user equipment performing a handoff.

FIG. 6 is an example process 600 of user equipment handoff as coordinated by a network site. At 602, the user equipment can transmit or provide location information, speed information, direction information, or combination thereof, to the connected network site, such as a cell tower. At 604, optionally, the user equipment can receive a schedule of transmission of the movement information, such as location, speed, direction, or combination thereof, from the connected network site. The schedule of the transmission of the movement information can be updated or revised based, such as by the connected network site based on the prior received movement information. For example, if the user equipment is moving slowly, the schedule can cause the movement information to be less frequently provided than if the user equipment was moving more quickly, since the quality of a signal between the user equipment and the connected network site is likely to change more slowly if the user equipment is moving more slowly.

At 606, the user equipment can receive handoff instructions from the connected network site. The handoff instructions can include instructions to cause the user equipment to wait or search for a message, on the common channel, from a new network site. At 610, the user equipment can receive connection instructions from the new network site. The instructions can include an indication of the resource to which the user equipment initiates a connection. At 612, the user equipment can disconnect from the connected network site and connect to the new site to complete the handoff to the new network site.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A method, comprising:
  receiving movement information from a user equipment, the movement information including at least one of a location of the user equipment, a speed of the user equipment and a direction of the user equipment;
  determining a quality of a signal between the user equipment and a current site to which the user equipment is connected;
  determining whether to initiate a handoff of the user equipment based on:
    the movement information, and
    the quality of the signal between the user equipment and the current site; and
  a network map that includes multiple network sites that are nearby or surrounding the user equipment or the current network site;
  analyzing a potential signal quality of a signal response for each of the multiple networks sites in the network map, each analysis of the potential signal quality based on a transmission received from the user equipment;
  identifying a potential network site of the multiple networks sites based on the analysis of the potential signal quality of the signal response for each of the multiple network sites in the network map,
  selecting the potential network site for the handoff based on the analysis of the potential signal quality and a characteristic or parameter of the network;
  transmitting an instruction to the potential network site via a communication pathway that is unusable by or inaccessible to the user equipment, the instruction to the potential network site including an instruction to initiate handoff of the user equipment to the potential network site; and
  based on the transmitted instruction to initiate the handoff of the user equipment to the potential network site, causing the potential network site to output a handoff instruction to the user equipment to initiate the handoff of the user equipment to the potential network site.

2. The method of claim 1, wherein the movement information from the user equipment is received at a variable frequency.

3. The method of claim 1, wherein the quality of the signal is a loudness of the signal between the user equipment and the current site to which the user equipment is connected.

4. The method of claim 1, wherein the movement information includes a location of the user equipment, and further comprising determining a location of the user equipment relative to the potential network site, and wherein the determining whether to initiate the handoff of the user equipment to the potential network site is further based on the location of the user equipment relative to potential network site.

5. The method of claim 4, wherein the movement information includes a direction of the user equipment, and wherein the determining whether to initiate the handoff of the user equipment to the potential network site is further based on the direction of user equipment.

6. The method of claim 1, further comprising instructing the user equipment to listen to a common channel for the instruction to initiate the handoff of the user equipment, and wherein the potential network site transmits the received instruction to initiate the handoff of the user equipment on the common channel.

7. A predictive handoff system for user equipment, comprising:
  a connected network site, including:
    a user equipment communication module configured to monitor a signal quality of a signal between a user equipment and the connected network site and to receive movement information from the user equipment;
    a handoff module configured to:
      evaluate the signal quality of the connected network site;
      analyze a potential signal quality of a signal response for each of multiple networks sites within a network map, the network map including the multiple network sites that are nearby or surrounding the user equipment or the current network site;

identify a potential network site of the multiple network sites based on the analysis of the potential signal quality of the signal response for each of the multiple network sites in the network map;

select the potential network site for a handoff based on the analysis of the potential signal quality and a characteristic or parameter of the network;

generate an instruction to initiate the handoff of the user equipment to the selected potential network site based on the analysis of the potential signal quality and a characteristic or parameter of the network, a network site communication module configured to transmit the instruction to initiate the handoff of the user equipment over a communication pathway that is unusable by or inaccessible to the user equipment; and a potential network site, including:

a network site communication module configured to receive the instruction from the connected network site over the communication pathway, the instruction causing the selected potential network site to initiate the handoff of the user equipment to the selected potential network site, wherein, based on the transmitted instruction to initiate the handoff of the user equipment to the selected potential network site, the selected potential network site is further configured to output the handoff instruction to the user equipment to initiate the handoff of the user equipment to the selected potential network site.

8. The predictive handoff system of claim 7, wherein the characteristic of the potential signal quality is a loudness of a signal between the user equipment and the respective potential network sites.

9. The predictive handoff system of claim 7, wherein the movement information includes at least one of a location of the user equipment, a speed of the user equipment and a direction of the user equipment.

10. The predictive handoff system of claim 9, wherein the movement information is received on a schedule.

11. The predictive handoff system of claim 10, wherein the schedule is variable and based on one or more of the location of the user equipment, the speed of the user equipment and the direction of the user equipment.

12. The predictive handoff system of claim 7, wherein the network site communication module is further configured to coordinate the handoff with the potential network site by causing the potential network site to output the handoff instruction to the user equipment to cause the user equipment to connect to the potential network site.

13. The predictive handoff system of claim 12, wherein the network site communication module is further configured to coordinate the handoff with the user equipment by causing the user equipment communication module to output an instruction for the user equipment to listen on a common channel for the instruction to initiate the handoff instruction.

* * * * *